March 19, 1929.　　F. L. CLAPP ET AL　　1,705,657
SELF MARKING TEST SHEET
Filed March 9, 1927　　2 Sheets-Sheet 1
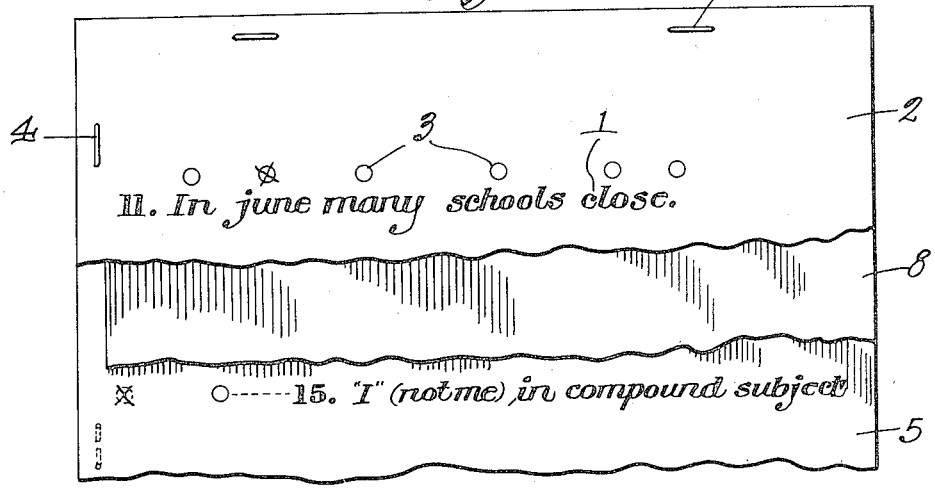
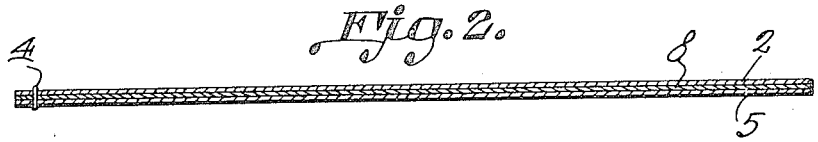
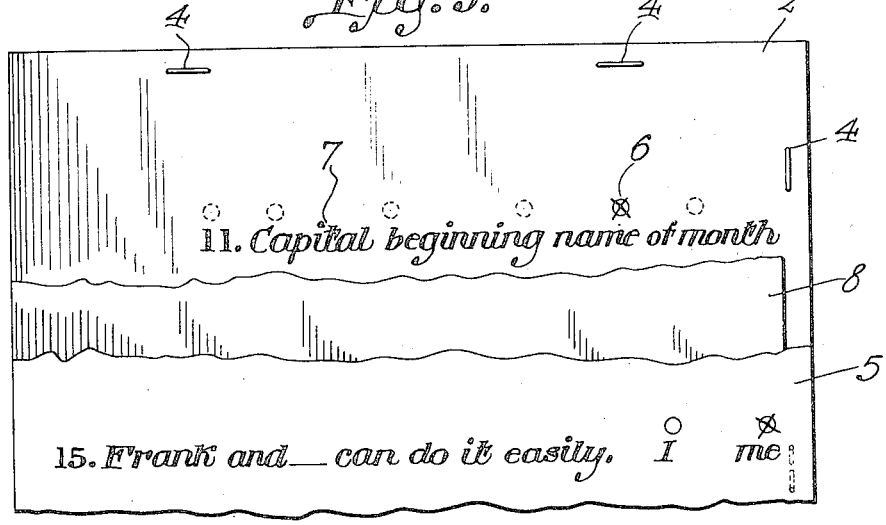
Frank L. Clapp and Robert V. Young, Inventors

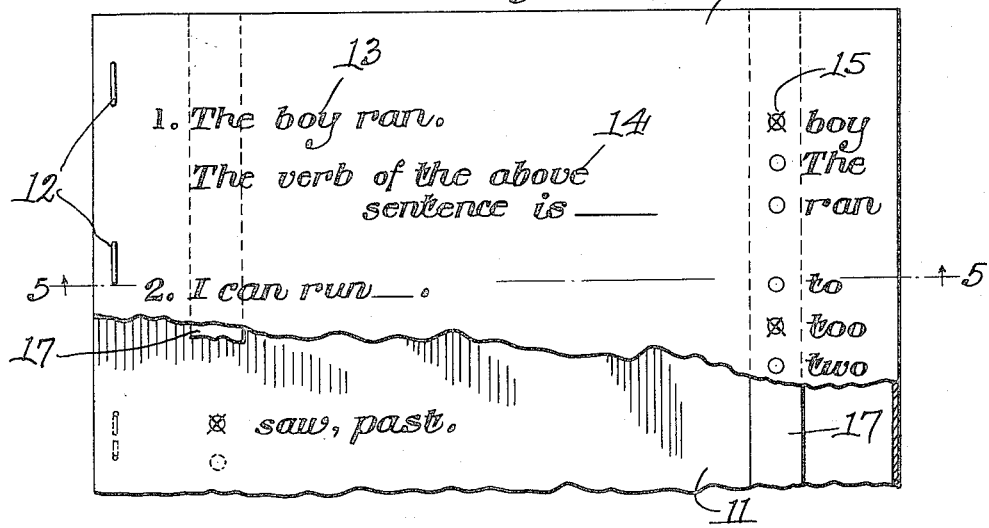
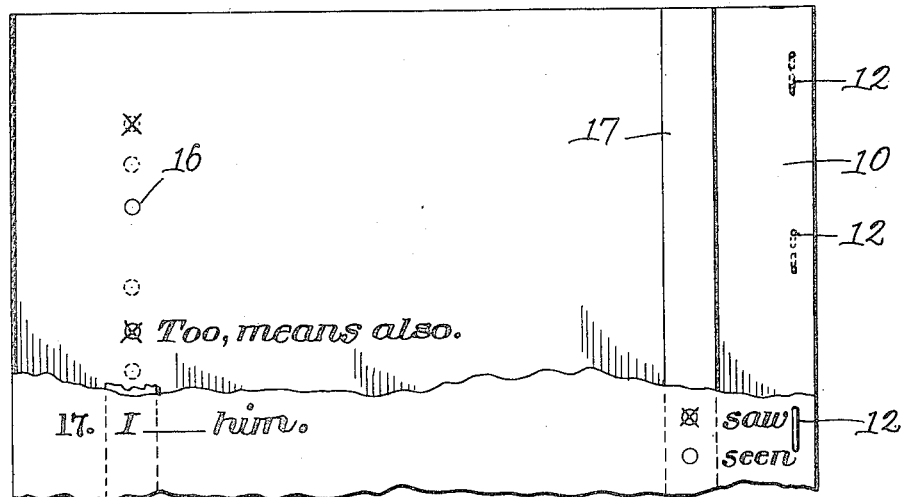

Patented Mar. 19, 1929.

1,705,657

UNITED STATES PATENT OFFICE.

FRANK L. CLAPP AND ROBERT V. YOUNG, OF MADISON, WISCONSIN.

SELF-MARKING TEST SHEET.

Application filed March 9, 1927. Serial No. 174,048.

This invention relates to self marking test sheets, one of its objects being to provide a means whereby school tests and exercises based on different subjects, both educational and non-educational intelligence tests, and in fact any arrangement of data requiring a recorded answer or entry, can be so arranged that a pupil or other person may indicate a judgment or choice on one side of a sheet of paper while at the same time the correctness or incorrectness of such judgment or choice is automatically recorded on another page.

It is a fact well known to instructors and others that the most trying and tedious work connected with written examinations and the like is the accurate correction of the papers submitted. This work requires the expenditure of considerable time which might otherwise be used to advantage but, as far as we are aware, no means has thus far been devised whereby work of this kind might be rendered less exacting.

It is an object of the present invention to provide a means whereby each person being subjected to a test will produce marks upon a normally concealed portion of the test sheets every time an entry is made in certain predetermined bounds, the concealed marks thus made being utilized in determining the correctness of the answers.

With the foregoing and other objects in view which will appear as the description proceeds, the invention resides in certain novel arrangements of parts which will be hereinafter more fully described and pointed out in the claims, it being understood that various changes may be made within the scope of the claims without departing from the spirit of the invention.

In the accompanying drawings portions of different forms of test sheets have been illustrated.

In said drawings,

Figure 1 is a plan view of one side of a test sheet utilizing an interposed transfer sheet of carbon paper or the like, the separate leaves making up the test sheet being broken away to show a test sentence on one page, the interposed transfer sheet, and the answer to another test sentence on the opposed sheet.

Figure 2 is a section on line 2—2, Figure 1.

Figure 3 is a view similar to Figure 1 but showing the opposite face of the test sheet, the respective leaves being broken away to show the answer to the test sentence illustrated in Figure 1, the test sentence, answered in figure 1 also being shown.

Figure 4 is a view similar to Figure 1 showing a modified arrangement wherein strips of transfer material are provided upon the inner or meeting faces of the leaves of the test sheet, said leaves being broken away so as to illustrate on one of the pages certain test sentences, the inner surface of the opposed leaf showing the answer to a test printed on the opposed side of the test sheet and appearing in Figure 6.

Figure 5 is a section on line 5—5, Figure 4.

Figure 6 is a view similar to Figure 4 showing the opposite side of the test sheet, the test sentence at the bottom thereof being the one answered in Figure 4 while the "X" marks appear in Figure 6 upon the inner surface of the back leaf of the test sheet represent marks entered by a pupil answering the tests appearing upon the upper portion of Figure 4.

In preparing the test sheets constituting the present invention the problems or the like to be solved or answered must be so arranged that the placing of a mark at a selected point by the person being examined will indicate whether or not that person knows the correct answer. For example if the test is based upon the subject of capitalization, punctuation, word form and grammar, in the study of English, the problems can consist of sentences containing the errors to be indicated by the pupil. Such problems will be printed on one page of the test sheet while suitably defined spaces can be designated in close proximity to the words and punctuation marks included in the sentence. In this connection attention is called to Figures 1, 2 and 3 wherein a sentence indicated at 1 is displayed on the outer face of a sheet 2, there being circles 3 printed above the different words and punctuation marks of the sentence. The sheet 2 is suitably connected as by means of staples 4 or the like to another sheet 5 constituting the back of the present sheet. The problem 1 appearing on sheet 2 consists of a sentence in which the error is in the word "june" which is not capitalized. Directly back of the circle 3 above this incorrect word "june" is printed another circle 6 and, if desired, an explanation of the correct answer can be printed adjacent this circle 6 as shown at 7. A transfer sheet in the form of a sheet of carbon paper indicated at 8 can be removably mounted between the two sheets 2 and 5 with the transfer surface in contact with the back of the sheet 2. Thus is will be seen that, if the pupil places a mark in the circle adjacent the word "june", thereby indicating that this word is incorrect, the mark thus produced will be simultaneously reproduced in the circle 6 on the back of sheet 2. Consequently the pupil or other person correcting the papers, after separating the sheets 2 and 5 and examining the backs of them, can instantly determine, by noting the location of the mark in circle 6, that the problem has been correctly answered by the pupil. Had the mark been placed in one of the other circles 3, the reproduction thereof on the back of the sheet 2 would not have appeared in the circle 6 and this would have indicated a wrong answer. After all of the problems or other tests on the sheet 2 have been answered the carbon or transfer sheet 8 can be withdrawn from between the connected sheets 2 and 5, reversed and reinserted. Thus problems or other tests printed on the other outer surface of the sheet 5 can be answered and these answers recorded on the back of said sheet. If the marks made by the pupil are reproduced in the spaces outlined on the back of the sheet, the teacher will know that the answers are correct. If, however, the marks appear outside of the enclosed spaces, the teacher will know that the answers are not correct. When the paper is returned to the pupil or other person given the test, the correct answers will be indicated at 7 on the surfaces previously concealed. It is to be understood of course that the arrangement of the essential elements of the test sheets can be varied and the test employed can be arranged to suit the requirements. For example, and as illustrated in Figures 4, 5 and 6 the test sheet can be formed of a sheet of paper folded along the center, as shown at 9, to provide superposed pages 10 and 11. These pages can be connected along one or more edges by means of staples 12 or the like and the various tests to be answered can be printed on the outer surfaces of the leaves 10 and 11 with the mark receiving spaces arranged in columns.

For example, in grammar tests sentences can be printed as shown in Figure 4. If it is desired that the pupil identify, for example, the verb of the sentence, "The boy ran", there will be printed adjacent this sentence 13 an added sentence such as "The verb of the above sentence is ———". See 14 in Figure 4. Then adjacent the sentences 13 and 14 will appear a column of outlined spaces 15, each designated by one of the words of the sentence 13. In the illustration the verb is "ran" and if the test is correctly answered the pupil will place a mark in the enclosed space 15 designated by the word "ran". In Figure 4, however, the mark has been placed in the space 15 designated by the word "boy". This answer is of course incorrect and by means of a transfer material interposed between the leaves 10 and 11, the mark made by the pupil will be reproduced on the back of sheet 10 outside of an enclosed space 16 printed directly back of the space 15 designated by the word "ran". Thus an inspection of the back of sheet 10 after the two sheets have been pulled apart will show that the test has been incorrectly answered. Similar arrangements of tests and columns of spaces can be provided on the outer surface of the sheet 11 and the markings by the pupil will be recorded on the back of said sheet 11 either within or outside of the circles printed thereon, thereby accurately indicating whether or not the tests had been answered correctly.

Where the mark receiving spaces are arranged in columns as shown in Figures 4 and 6 the transfer material can be in the form of strips of carbon paper indicated generally at 17, these strips being so positioned as to transfer the marks to the back face of the sheet on which the pupil is working. In other words the transfer material 17 affixed to the inner surface of the sheet 11 will be directly back of the outlined spaces 15 on the sheet 10 while the transfer material on the back surface of the sheet 10 will be directly opposite the column of outlined spaces on the outer surface of the sheet 11. Another and obvious modification of this device would be the arrangement of the transfer material back of all spaces except those designed to receive the correct answers. Thus marks incorrectly placed would be the only ones transferred to the backs of the sheets. Consequently a paper showing by the marks on the front face thereof that every test has been answered but having no marks on the back would be without errors. Instead of having the transfer material formed of affixed strips of carbon paper or the like, the transfer material can be printed or otherwise applied directly to the inner surfaces of the sheets.

While the tests or problems illustrated apply solely to English, it is to be understood that various other tests can be used in connection with the self marking feature constituting the present invention. Furthermore the arrangement of the transfer means can be varied at will and the sheets can be printed with or without outlined mark receiving spaces, the locations of the marks relative to the edges of the sheets being adapted to determine the correctness of the answers.

What is claimed is:

1. A test device having a surface with problems thereon exposed while in use, another surface of the device being concealed while in use by the person being examined, there being defined spaces associated with the problems on the exposed surface for receiving marks indicating given solutions of the problems, and means for reproducing upon a concealed surface of the device a mark applied to a selected portion of the space on the exposed surface by the person being examined, said reproduced mark upon the concealed surface indicating the correctness of the solution.

2. A test device including superposed leaves having their inner faces normally concealed, a problem upon the outer surface of one of said leaves adapted to be marked by a person being examined, and means for designating a selected portion of a concealed face of the device by the act of solving the problem.

3. A test device including superposed leaves having their inner faces normally concealed, a problem upon the outer surface of one of said leaves adapted to be correctly or incorrectly marked by a person being examined, means between the concealed faces for reproducing on one of said concealed faces a mark made upon an exposed face by the person being examined; and means on said concealed face cooperating with the mark produced on said face, for indicating whether the solution of the problem is correct or incorrect.

4. A test device having a surface with problems thereon exposed while in use, another surface being concealed during use by the person being tested, there being defined spaces associated with problems on the exposed surface for receiving marks indicating given solutions of the problems, means controlled by the person being tested for reproducing on the concealed surface of the device the mark applied to the exposed surface; and means on said concealed surface cooperating with the mark on said surface for indicating whether or not the problem is correctly solved on the exposed surface.

5. A test device in sheet form, having one surface normally concealed while in use by the person being tested and having another surface normally exposed while in use on which exposed surface appear problems adapted to be solved by a person using the test device, there being defined spaces associated with each problem on the exposed surface, one of which defined spaces is designed to receive a mark when the person being tested or using the problems indicates the correct solution of the problems; there being means for reproducing on the concealed surface of the sheet of paper the mark applied by the person being tested or using the problems when said mark indicates a correction solution.

6. A test device including superposed sheets having adjoining faces normally concealed while in use, and having on their exposed surfaces problems adapted to be solved by the person using the device; there being defined spaces associated with each problem on the exposed surfaces, one of which spaces is designed to receive a mark when the person using the device indicates a solution of the problem; there being means for reproducing upon a concealed face, any mark applied to any predetermined space on the exposed surface by the person using the device.

7. A test device in sheet form, having one surface normally concealed while in use by the person being tested and having another surface normally exposed while in use on which exposed surface appear problems adapted to be solved; there being defined spaces associated with each problem on the exposed surface, one of which defined spaces is designed to receive a mark when the person using the device indicates a solution of the problem; there being means for reproducing on the concealed surface of the sheet of paper the mark applied to the exposed surface by the person using the device when said mark indicates a solution, the appearance of the concealed surface following the marking of a solution on the exposed surface being such as to indicate whether the solution is correct.

8. A test device including superposed sheets having the adjoining faces normally concealed while in use by the person being tested, and having on an exposed surface, problems adapted to be solved by the person using the device; there being defined spaces associated with each problem on the exposed surface, one of which defined spaces is designed to receive a mark when the person using the device indicates a solution of the problem; there being means for reproducing upon a concealed surface any mark applied to an exposed surface by the person using the device, the appearance of the concealed surface following the marking of a solution on the exposed surface being such as to indicate whether the solution is correct.

9. A sheet of paper, or the like, having one surface normally concealed while in use by a person being tested and having another surface normally exposed while in use on which exposed surface appear problems adapted to be solved there being defined spaces associated with each problem on the exposed surface, one of which defined spaces is designed to receive a mark when the person using the paper indicates the correct solution of the problem while one of the other spaces receives the mark when an incorrect solution is indicated; there being means for reproducing on the concealed surface of the sheet of paper the mark applied to the exposed surface by the person using the paper, the location of the reproduced mark on the concealed surface indicating whether the solution is correct.

10. A number of superposed sheets of paper, or the like, having the inner faces of each successive two normally concealed while in use by a person being tested, and having on their exposed surfaces problems adapted to be solved by the person using the sheets; there being defined spaces associated with each problem on the exposed surfaces, one of which defined spaces is designed to receive a mark when the person using the sheets indicates the correct solution of the problem while one of the other spaces receives the mark when an incorrect solution is indicated; there being means for reproducing on one of the concealed surfaces the mark applied to an exposed surface by the person using the sheets, the location of the mark on the concealed surface indicating whether the solution is correct.

11. A test device in sheet form having one surface normally concealed while in use by a person being tested and having another surface normally exposed while in use on which exposed surface appear problems adapted to be solved by a person using the device; there being defined spaces associated with each problem on the exposed surface, one of which defined spaces is designated by the person using the device when a correct solution is indicated while one of the other spaces is designated when an incorrect solution is indicated; there being means whereby the person using the device when he indicates a correct solution at the same time and by the same act designates a selected portion of the concealed face of the device, the designation of such selected portion of the concealed surface indicating a correct solution, while a failure to designate same indicates an incorrect solution.

12. A test device including superposed sheets of paper having the inner surfaces normally concealed while in use by a person being tested and having upon their exposed surfaces problems adapted to be solved by the person using the device; there being defined spaces associated with each problem on the exposed surface, one of which defined spaces is designated by the person using the device when a correct solution is indicated while one of the other spaces is designated when an incorrect solution is indicated; there being means whereby the person using the device when he indicates a correct solution at the same time and by the same act designates a selected portion of a concealed surface of the test device, the designation of such selected portion of the concealed surface indicating a correct solution, while a failure to designate same indicates an incorrect solution.

13. A test device including superposed sheets having the adjoining surfaces thereof normally concealed while in use by a person being tested and having upon an exposed surface problems adapted to be solved by the person using the device; there being defined spaces in connection with each problem in which the person using the device marks a solution; there being means between the sheets for reproducing on a concealed surface the solution as indicated on the exposed surface; and there being printed on the concealed surface on which the reproduced solution appears the correct solution, thereby to enable an easy comparison of the correct solution with the solution written by the person using the test device.

14. A test device comprising a sheet having thereon a problem and including correct and incorrect solutions of the problem, there being a series of defined spaces on said test device, one defined space being provided for every indicated solution, every defined space being associated with one of the respective solutions.

In testimony that we claim the foregoing as our own, we have hereto affixed our signatures.

FRANK L. CLAPP.
ROBERT V. YOUNG.